(12) United States Patent
Wu

(10) Patent No.: US 8,775,676 B2
(45) Date of Patent: *Jul. 8, 2014

(54) CONTEXT TRANSFER AND COMMON IP ADDRESS FOR DHCP PROXY SOLUTION IN WIMAX

(75) Inventor: Yingzhe Wu, San Marcos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 882 days.

This patent is subject to a terminal disclaimer.

(21) Appl. No.: 12/912,484

(22) Filed: Oct. 26, 2010

(65) Prior Publication Data

US 2011/0040854 A1    Feb. 17, 2011

Related U.S. Application Data

(63) Continuation of application No. 11/853,714, filed on Sep. 11, 2007, now Pat. No. 7,836,206.

(60) Provisional application No. 60/827,839, filed on Oct. 2, 2006.

(51) Int. Cl.
G06F 15/16    (2006.01)
G06F 12/00    (2006.01)

(52) U.S. Cl.
USPC ........................................................ 709/245

(58) Field of Classification Search
USPC .......... 709/217–219, 220–229, 250, 230, 245
See application file for complete search history.

(56) References Cited

U.S. PATENT DOCUMENTS

| 6,598,133 | B2 * | 7/2003 | Schroeder ..................... 711/156 |
| 6,614,788 | B1 | 9/2003 | Martin et al. | |
| 7,016,353 | B2 | 3/2006 | Proctor et al. | |
| 7,836,206 | B2 * | 11/2010 | Wu ............................... 709/245 |

(Continued)

FOREIGN PATENT DOCUMENTS

| CN | 101047997 A | 10/2007 |
| JP | 2005-79672 | 3/2005 |
| WO | WO 2005/050897 A2 | 6/2005 |

OTHER PUBLICATIONS

PCT International Search Report and PCT Written Opinion of the International Searching Authority for PCT/CN2007/070815, forms PCT/ISA/220, PCT/ISA/210 and PCT/ISA/237, mailed Dec. 27, 2007, Applicant: Huawei Technologies Co., Ltd., et al., 9 pages.

(Continued)

Primary Examiner — Zarni Maung
(74) Attorney, Agent, or Firm — Slater & Matsil, L.L.P.

(57) ABSTRACT

A network comprising a network component configured with a common internet protocol (IP) address, wherein a similar network component in a similar network is configured with the common IP address, and wherein the network is in communication with the similar network. The disclosure includes a network component comprising a processor configured to implement a method comprising communicating with a mobile station (MS) using an IP address that is common for similar elements in similar networks, and receiving a dynamic host configuration protocol (DHCP) context associated with the MS. Also disclosed is a first access network in communication with a second access network, the first access network comprising a first DHCP proxy configured with a substantially identical IP address as a second DHCP proxy in the second access network, and an agent configured to promote transfer of a DHCP context to the second access network.

22 Claims, 3 Drawing Sheets

(56) References Cited

U.S. PATENT DOCUMENTS

| | | | |
|---|---|---|---|
| 8,477,775 B2* | 7/2013 | Choudhary et al. | 370/389 |
| 2003/0005240 A1* | 1/2003 | Schroeder | 711/156 |
| 2003/0115362 A1 | 6/2003 | Tarvainen et al. | |
| 2004/0213234 A1 | 10/2004 | Koch et al. | |
| 2007/0002833 A1 | 1/2007 | Bajic | |
| 2010/0290398 A1* | 11/2010 | Choudhary et al. | 370/328 |

OTHER PUBLICATIONS

Droms, R., et al., "Dynamic Host Configuration Protocol for IPv6 (DHCPv6)," Network Working Group, RFC3315, Standards Track, Jul. 2003, 95 pages.

* cited by examiner

CONTEXT TRANSFER AND COMMON IP ADDRESS FOR DHCP PROXY SOLUTION IN WIMAX

This is a continuation application of U.S. application Ser. No. 11/853,714, which was filed on Sep. 11, 2007 now U.S. Pat. No. 7,836,206 and that claims priority to U.S. Provisional Patent Application No. 60/827,839, filed on Oct. 2, 2006, both of which are hereby incorporated by reference in their entireties.

BACKGROUND

An Internet Protocol (IP) address typically comprises a series of domains arranged in a hierarchical series. Specifically, an IP address may begin with a broad IP domain, which is followed by a plurality of more specific IP domains within each preceding domain. When the devices associated with IP addresses (IP devices) are relatively stationary, it is possible to determine which networks the IP device is associated with based on the domains in the IP addresses. Such a hierarchical structure of the IP address aids in routing messages, packets, and other data to the IP device. If the IP device moves to another network having a different IP domain, then the IP device can be issued a new IP address consistent with that domain, using a protocol such as dynamic host configuration protocol (DHCP). However, when an IP device is mobile (mobile station (MS)), the issuance of a new IP address to the MS every time the MS changes networks is an unattractive solution.

One solution to the above problem is to issue the MS a relatively permanent IP address, such as one associated with the MS's home network, and use the mobile IP (MIP) protocol to tunnel between the MS's home network and the foreign network to which the MS is connected. The MIP protocol ensures that a moving MS can continue to receive packets while maintaining an IP address assigned in a different network. Unfortunately, many MSs do not support MIP. In order to make those MSs without MIP capability have the same mobility performance as those with MIP capability, WiMAX has designed a Proxy MIP (PMIP) protocol. The PMIP protocol includes a network entity called a PMIP client that has MIP capability and conducts MIP operations on behalf of the MS. Since the MSs use DHCP to obtain IP addresses, the PMIP protocol includes a network entity called a DHCP proxy that provides the behavior expected by the MS from a DHCP server.

SUMMARY OF THE INVENTION

In a first embodiment, the disclosure includes a network comprising a network component configured with a common IP address, wherein a similar network component in a similar network is configured with the same common IP address, and wherein the network is in communication with the similar network.

In a second embodiment, the disclosure includes a network component comprising a processor configured to implement a method comprising communicating with a MS using a common IP address that is the same for similar elements in similar networks, and receiving a DHCP context associated with the MS.

In a third embodiment, the disclosure includes a first access network in communication with a second access network, the first access network comprising a first DHCP proxy configured with an identical IP address as a second DHCP proxy in the second access network, and an agent configured to promote transfer of a DHCP context to the second access network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a solution for the situations when an MS moves to an access network with a different DHCP proxy. Specifically, disclosed herein is a system and method for utilizing a common IP address for DHCP proxies in a plurality of access networks. By utilizing a common IP address for the DHCP proxies in the various access networks, when the MS moves from a previous access network to a new access network, the MS can use the DHCP proxy in the new access network without reconfiguring the IP address for the DHCP proxy. Using the DHCP proxy in the new access network is superior to continuing to use the DHCP proxy in the old access network because DHCP messages from the MS do not need to be routed to the old DHCP proxy.

When using the common IP address for multiple DHCP proxies, collisions between the DHCP messages associated with the common IP address may be avoided by prohibiting the messages associated with the common IP address from leaving the access network. Also disclosed is a mechanism for transferring a DHCP context from the previous access network to the new access network when the MS moves between the access networks. The use of the common IP address and DHCP context transfer may be beneficial in that it facilitates the use of the DHCP proxy in the new access network rather than maintaining the use of the DHCP proxy in the old access network. This removes the necessity for the DHCP messages from the MS to be intercepted and forwarded to the old access network.

Figure 1:
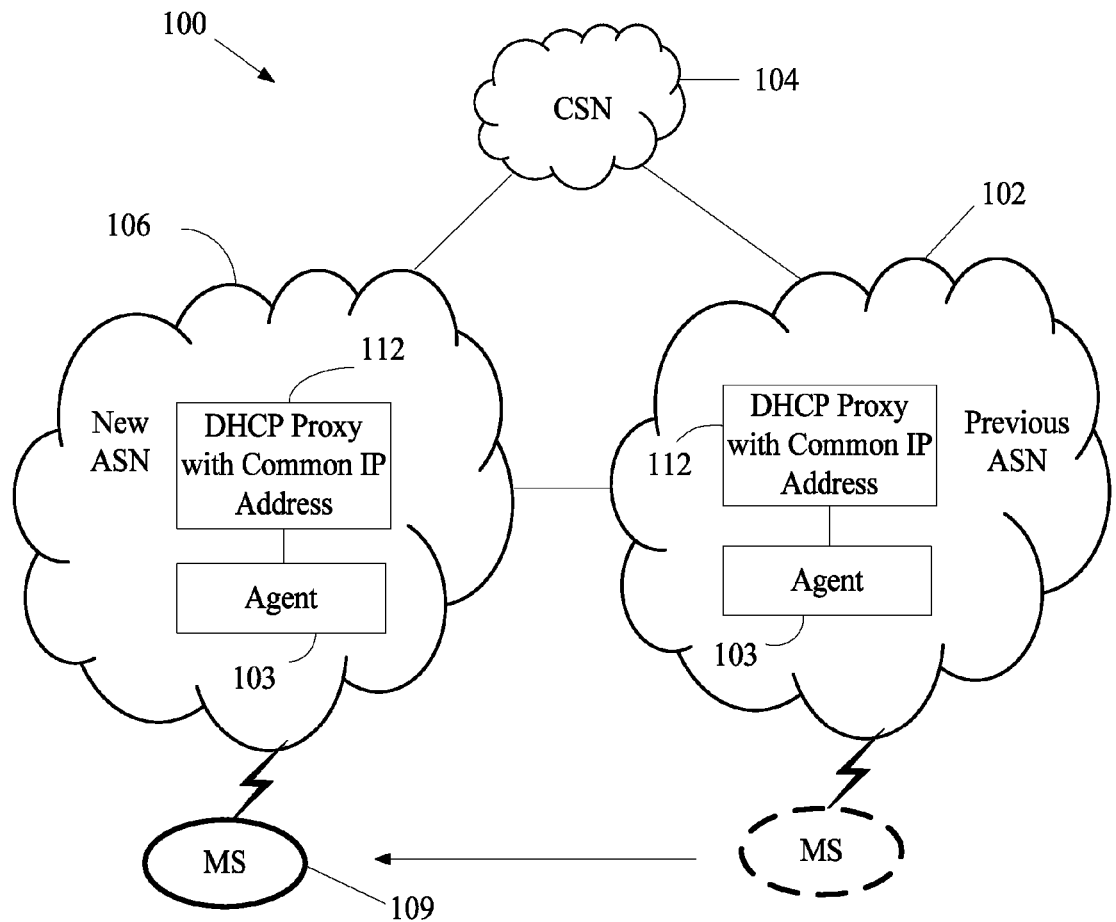
FIG. 1 is a schematic diagram of one embodiment of an IP network.

FIG. 1 illustrates an embodiment of an IP network 100. The network 100 may include a previous access service network (ASN) 102, a connection service network (CSN) 104, a new ASN 106, and a MS 109. The CSN 104 may communicate directly or indirectly with the ASNs 102, 106, while the ASNs 102, 106 may communicate directly or indirectly with each other and the MS 109. One or both of the ASNs 102, 106 may include a DHCP proxy 112 with a common IP address and/or an agent 103.

The MS 109 may be any device that access or communicates, directly or indirectly, with the ASNs 102, 106, and/or the CSN 104. Specifically, the MS 109 may be a wireless device that communicates with the CSN 104, the DHCP proxies 112, the agents 103, and/or other MSs 109 via the ASNs 102, 106. The MS 109 may have an IP address assigned to it by one of the ASNs 102, 106 or the CSN 104. In a specific embodiment, the MS 109 does not support mobile IP (MIP), or may be unable to independently move between ASNs 102, 106 without changing its IP address. Examples of suitable MSs 109 include personal digital assistants (PDAs), portable computers, such as laptop, notebook, and tablet computers, cellular telephones, and other mobile communication or computing systems. Other examples of suitable MSs 109 include other types of computers, such as desktop, workstation, and kiosk computers using a wireless network connection. Alternatively, the MS 109 may be any other type of computer or communication device known to persons of ordinary skill in the art.

The ASN 102, 106 are access networks that provide wireless radio access to the MS 109. Specifically, the ASNs 102, 106 allows the MS 109 to communicate with other users, networks, and devices, such as the CSN 104. The previous ASN 102 and the new ASN 106 may be differentiated from the perspective of the MS 109 in that the MS 109 was previously in communication with the previous ASN 102, but has moved such that it is in communication with the new ASN 106. A plurality of the ASNs 102, 106 may be associated with a common network access provider (NAP). In addition, the ASNs 102, 106 may be associated with more than one CSN 104, or each may be associated with different CSNs 104.

The ASNs 102, 106 may perform various functions for the MS 109. These functions include network connection, radio resource management, ASN anchored mobility, CSN anchored mobility, paging, and ASN-CSN tunneling. ASN anchored mobility refers to mobility within one or more ASNs without foreign agent (FA) relocation. FA relocation refers to a process in which the MS 109 performs MIP registration with a new FA as a result of moving from one ASN 102, 106 to another ASN 102, 106. CSN anchored mobility refers to a set of procedures associated with the handover of the MS between a CSN and an ASN or between an ASN and another ASN, where FA relocation may be involved. ASN-CSN tunneling refers to the encapsulation of messages that are passed between the ASN and the CSN.

In contrast, the CSN 104 may provide IP connectivity services to IP subscribers, such as the MS 109. The connectivity services may include assigning IP addresses to the MS 109, DHCP proxies 112, the agents 103, and/or any other network entities. Such addresses may include permanent or fixed addresses as well as proxy or care-of addresses. Other connectivity services include ASN-CSN tunneling support, subscriber billing, inter-operator settlement, inter-CSN tunneling, inter-ASN mobility, various WiMAX services, and connectivity for peer-to-peer services, among others. MIP may be implemented between the CSN 104 and the ASNs 102, 106. In an embodiment, the CSN 104 is part of a network service provider (NSP).

The networks 102, 104, 106 may include infrastructure to carry out communications with a plurality of devices and networks, such as wireless access points (WAPs), base transceiver stations (BTSs), base station controllers (BSCs), mobile access gateways (MAGs), local mobility agents (LMAs), routers, switches, bridges, and/or routing logic circuitry. Specific examples of suitable networks 102, 104, 106 may include one or more of the following networks: the worldwide interoperability for microwave access (WiMAX), Wireless Fidelity (Wi-Fi), code division multiple access (CDMA), wideband CDMA (WCDMA), orthogonal frequency division multiple access (OFDMA), time division multiple access (TDMA), global system for mobile communications (GSM), enhanced data for GSM evolution (EDGE), universal mobile telecommunications system (UMTS), advanced mobile phone service (AMPS), one of the Institute for Electrical and Electronic Engineers (IEEE) 802 wireless networks, or any other wireless network. In other embodiments, one or all of the networks 102, 104, 106 may be a public switched telephone network (PSTN), a packet switched network (PSN), an intranet, the Internet, a local area network (LAN), or any other network known to persons of ordinary skill in the art.

One or more of the networks 102, 104, 106 may contain the agent 103. The agent 103 may be a network element or functionality that aids in managing the MS 109, tunneling packets to other agents in other networks, advertising care-of addresses (CoA) that may serve as the termination point of the tunnel, maintaining current location information for the MS 109, and/or routing messages between the MS 109 and the DHCP proxy 112. In a specific embodiment, the previous ASN 102 may be a home ASN, and the new ASN 106 may be a foreign ASN. In such an embodiment, the agent in the home ASN may be a home agent (HA), and the agent in the foreign ASN may be a FA.

DHCP is a defined protocol used by networked computers or clients to obtain IP addresses and other parameters such as the default gateway, subnet mask, and IP addresses of domain name system (DNS) servers from a DHCP server. The DHCP server ensures that all IP addresses are unique, e.g., no IP address is assigned to a second client while the first client's assignment is valid or its lease time has not expired. DHCP servers provide IP address leases, which typically comprise the IP address and an IP address lease time, which may be renewed by the MS 109 multiple times.

In an embodiment, the ASNs 102, 106 contain a DHCP proxy that receives all relevant IP configuration parameters for the MS (e.g., IP address, address lease time, DNS server addresses, etc) from PMIP registration or AAA authentication. The DHCP proxy then interacts with the MS using DHCP protocol for assigning these IP configuration parameters, as if the MS were communicating with a DHCP server.

In specific embodiments, the DHCP proxy 112 may be part of a node or device, such as an access point (AP), BTS, BSC, MAG, LMAs, or router. In addition, the DHCP proxy 112 may be implemented at the same node or device in the ASN 102, 106 as the agent 103.

The DHCP proxy 112 may be configured with a common IP address. As used herein, the term "common IP address" may refer to a source address, destination address, or other designation that is identical for similar network components or elements in similar but different networks. For example, the DHCP proxies 112 in ASNs 102, 106 may contain a common IP address when both DHCP proxies are configured with the IP address 10.10.10.10. The common IP address may be used by the DHCP proxies 112 everywhere, by the DHCP proxies 112 within a NAP, by a subset of the DHCP proxies 112 within the NAP, by the DHCP proxies 112 associated with a NSP, by a subset of the DHCP proxies 112 associated with the NSP, or by any other combination of DHCP proxies 112.

The common IP address may be configured using various methods. For example, the common IP address may be fixed in that it does not change, or may be dynamic in that it is provided to an MS using network signaling. The common IP address may be configured either manually or automatically, as those terms are understood in the art. The common IP address may be public in that it is published, advertised, or otherwise made available to other networks. Alternatively, the common IP address may be private in that it is not published, advertised, or otherwise made available to other networks. Regardless of its configuration, the common IP address needs to be made available to the MS 109 in order for the MS 109 to be able to contact the DHCP proxy 112 upon entry into the ASN 102, 106.

In an embodiment, the common IP address may be made known to the MS 109 using standard DHCP messages. For example, upon initial network entry, when the MS does not have an IP address, the MS 109 may broadcast a DHCP discovery message. The DHCP proxy 112 may respond to the discovery message with a DHCP offer message that may include the common IP address. Specifically, the DHCP proxy 112 may use the common IP address as the server identifier and/or the source IP address in the DHCP messages sent to the MS 109. Once the MS has obtained the common IP address for the DHCP proxy, it will use this address for as long as it uses its assigned IP address.

Other alternative messages or methods may also be used to make the common IP address known to the MS 109. For example, the DHCP proxy 112 may periodically broadcast the common IP Address. Alternatively, the MS 109 may broadcast a DHCP request message after receiving the DHCP offer message, and the DHCP proxy 112 may include the common IP address in the DHCP acknowledge message in response to the DHCP request message. The common IP address may make the MS 109 believe that it is communicating with the same DHCP proxy regardless of what ASN the MS 109 is communicating with, even though the MS 109 is actually communicating with a completely separate DHCP proxy.

Traditionally, if multiple components contain the same IP address, there will be collisions in the network. Collisions refer to those cases where the routers and other network components do not know which component originated or should receive a message. Collisions may be avoided in the present system by prohibiting messages associated with the common IP address from leaving the boundary of the network. For the purposes described herein, messages associated with the common IP address include messages that have the common IP address as the source address or the destination address, as well as any other messages that may be associated with the common IP address. As an example, the new ASN 106 may be configured with one DHCP proxy 112 having the common IP address. In such a case, messages associated with the common IP address go to or originate from the single DHCP proxy 112, and thus there are no collisions within the ASN 106. In addition, messages associated with the common IP address remain in the ASN 106 in that they are prohibited from going to the CSN 104, the ASN 102, or any other network, which prevents collisions outside of the network. Firewalls at the network boundary may be used to enforce this prohibition on network traffic. In addition, the DHCP proxy 112 may be configured with other, uncommon IP addresses that may be used to communicate with entities outside of the DHCP proxy's ASN.

Figure 2:
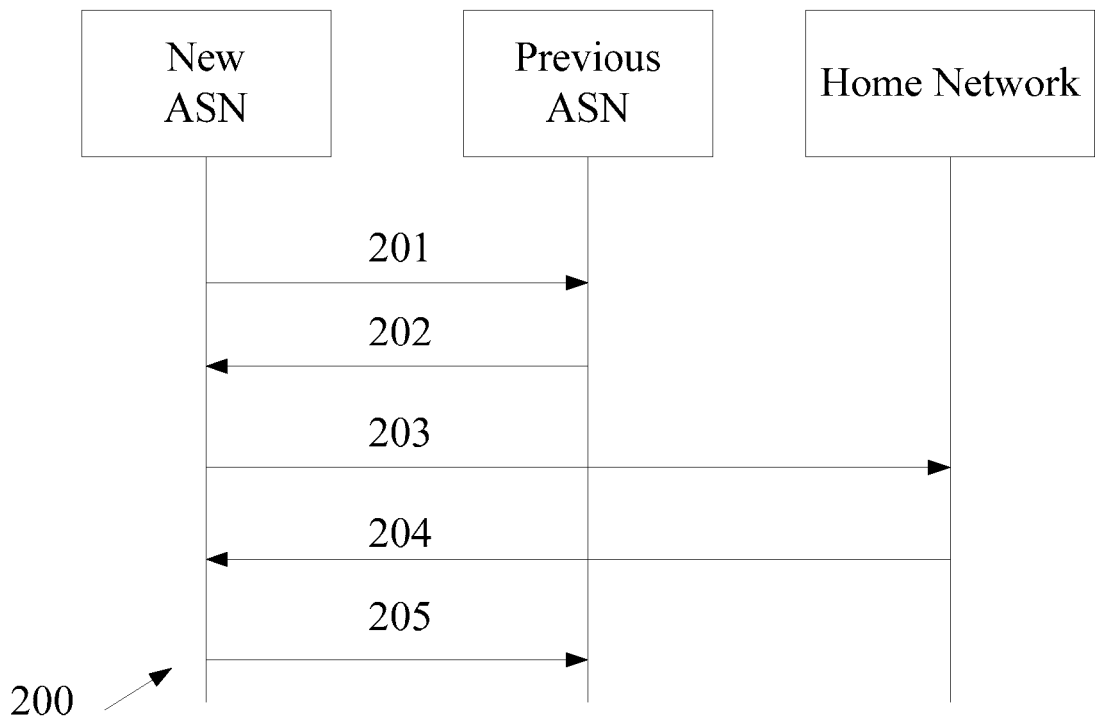
FIG. 2 is a protocol diagram of an embodiment of the DHCP context transfer messaging.

FIG. 2 is a protocol diagram illustrating one embodiment of a method 200 for transferring the DHCP context between ASNs. The DHCP context may contain the IP address assigned to the MS, the IP address lease time, and/or any other information regarding the MS that the previous ASN has and the new ASN returns. A DHCP context may need to be transferred between the previous ASN and the new ASN when the MS moves between the ASNs. In a specific embodiment, existing FA relocation messages may be used to achieve the DHCP context transfer. The DHCP context transfer may allow the handover between the agents 103 and the DHCP proxies 112 in the previous ASN 102 and the new ASN 106 to occur substantially simultaneously. Stated differently, the agent 103 and the DHCP proxy 112 may relocate access networks together.

At 201, the new ASN may initiate the DHCP context transfer. The new ASN may initiate the DHCP context transfer, for example, upon recognition that the MS has entered the new ASN or upon receipt of a message from the MS. The DHCP context transfer may be initiated by sending an initiation message to the previous ASN. In a specific embodiment, the initiation message is an existing FA relocation message.

If the previous ASN agrees to the DHCP context transfer, the previous ASN may respond with the DHCP context at 202. Alternatively, if the previous ASN is aware of or can predict which ASN the MS is going to, the previous ASN may initiate the DHCP context transfer at 202. In either case, the response may comprise a message, packet, or other data structure that contains the DHCP context described above. The response may also comprise other information, such as the common IP address, an authenticator ID, or any other information. In a specific embodiment, the response message is an existing FA relocation response message.

At 203, the new ASN may register with the MS's home network. Specifically, the new ASN may send a message to the home network to inform the home network that any messages, packets, or other data destined for the MS should be directed to the new ASN. The message may contain the MS's IP address, the agent in the previous and/or new ASN, or a proxy MIP client in the previous and/or new ASN. In a specific embodiment, the message may be a MIP relocate request (RRQ) message. At 204, the home network may respond with a confirmation of the new ASN's registration. Such a confirmation message may be in the form of a registration request response (RRR).

In an alternative embodiment, the previous ASN may register the new ASN with the home network. Specifically, the previous ASN may send a message to the home network informing the home network of the movement of the MS from the previous network to the new network. Such a message may contain any of the information identified above. The home network may then optionally respond to the previous ASN, the new ASN, or both.

At 205, the new ASN confirms that the DHCP context transfer was successful. The confirmation may allow the previous ASN to release any resources dedicated to the MS, and may absolve the previous ASN of any further responsibility towards the MS. In a specific embodiment, the new ASN may confirm the DHCP context transfer using an existing FA relocation message.

Figure 3:
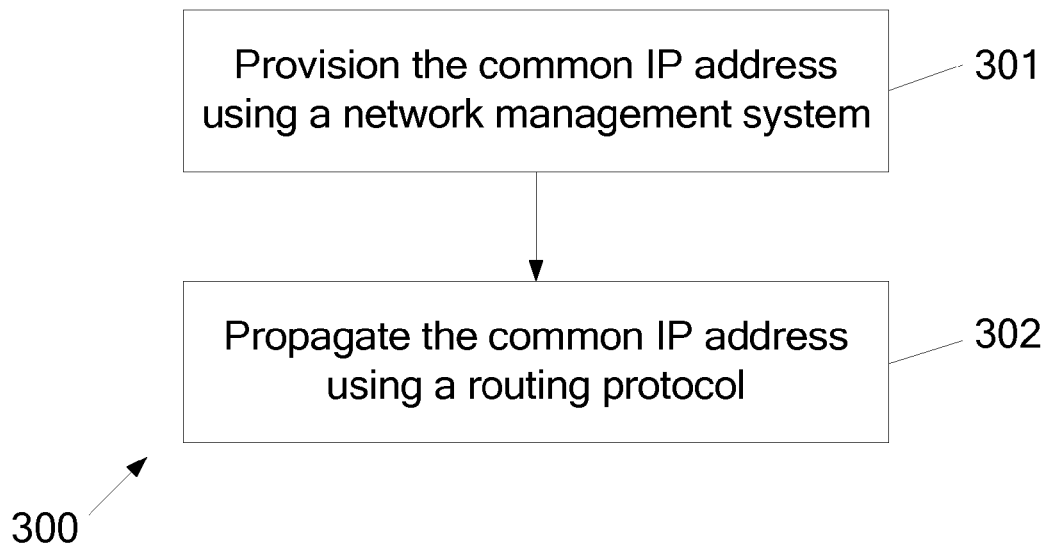
FIG. 3 is a flowchart of an embodiment of an IP address assignment and DHCP context transfer method.

FIG. 3 illustrates one embodiment of a method 300 for assigning a common IP address to a DHCP proxy. The method 300 may include provisioning the common IP address at 301. Provisioning the common IP address may involve provisioning the common IP address into the routing table of the router or other component associated with the DHCP proxy. Provisioning the common IP addresses may be accomplished via a network management system, a routing protocol, or combinations thereof. Specifically, the network management system may allow an operator to provision the common IP address into each ASN in a NAP's domain. The method 300 may also include propagating the common IP address at 302. Propagating the common IP address may involve using a routing protocol, such as internet control message protocol (ICMP) router discovery protocol, to help propagate the common IP address to routers in the ASNs of the NAP.

Figure 4:
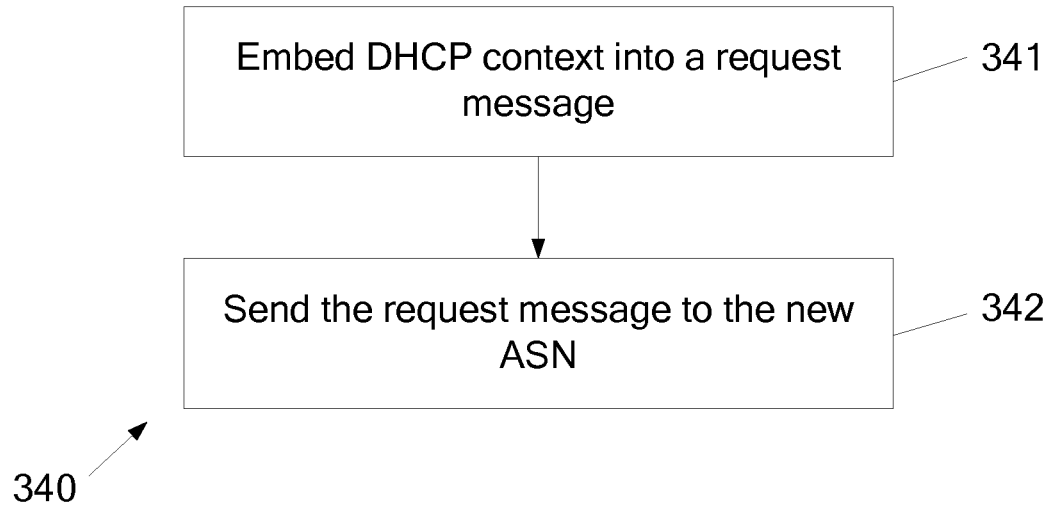
FIG. 4 is a flowchart of an embodiment of a DHCP context transfer method.

FIG. 4 illustrates one embodiment of a method 340 for transferring a DHCP context during FA relocation. The method 340 may include embedding the DHCP context into an existing relocation message at 341. Upon completion of the embedding, the previous ASN may send the request message to the new ASN at 342. The new ASN may then use the DHCP context information to perform any mobility related functions for the MS. The new ASN may also send a response message to the previous ASN to indicate that the DHCP context transfer is complete.

While the methods and systems described herein have been illustrated using the DHCP proxy, the methods and systems described herein may be applied to other IP devices as well. For example, the common IP address may be used for any network component that is substantially the same in a plurality of networks such that the use of the common IP address may reduce signaling, aid in handover, or may otherwise be beneficial. For example, it is contemplated that the agents described herein may also be associated with a common IP address, albeit one that is separate from the common IP address used for DHCP proxies. Persons of ordinary skill in the art are aware of other network components that may benefit from use of the common IP address.

Figure 5:
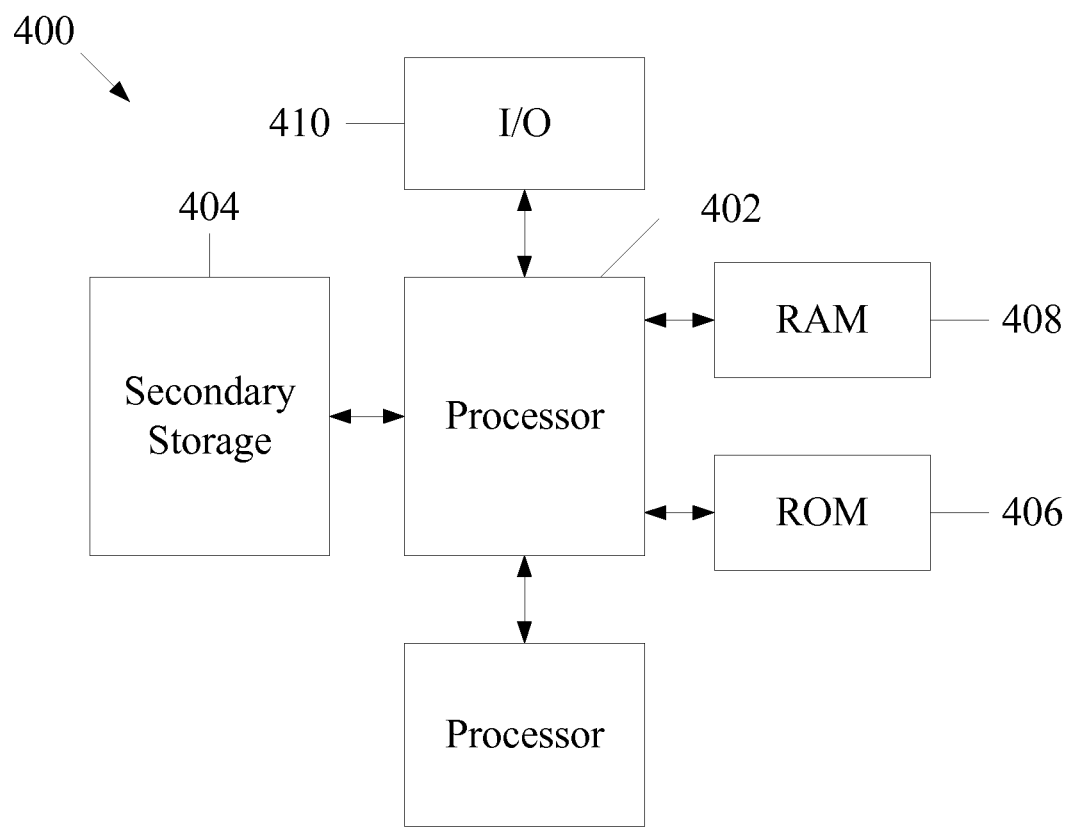
FIG. 5 is a schematic diagram of an embodiment of a general-purpose computer system.

The network described above may be implemented on any general-purpose network component, such as a computer or network component with sufficient processing power, memory resources, and network throughput capability to handle the necessary workload placed upon it. FIG. 5 illustrates a typical, general-purpose network component suitable for implementing one or more embodiments of a node disclosed herein. The network component 400 includes a processor 402 (which may be referred to as a central processor unit or CPU) that is in communication with memory devices including secondary storage 404, read only memory (ROM) 406, random access memory (RAM) 408, input/output (I/O) 410 devices, and network connectivity devices 412. The processor may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 608 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage. The RAM 408 is used to store volatile data and perhaps to store instructions. Access to both ROM 406 and RAM 408 is typically faster than to secondary storage 404.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network comprising:
    a network component comprising a processor, wherein the processor is configured to communicate with a mobile station (MS) using an internet protocol (IP) address that is common for similar elements in similar networks, and wherein each of the similar elements in the similar networks has another IP address in addition to the common IP address; and
    the processor is configured to receive a dynamic host configuration protocol (DHCP) context associated with the MS, wherein a similar network component in a similar network is configured with the common IP address, and wherein the network is in communication with the similar network.

2. The network of claim 1, wherein the network component is a dynamic host configuration protocol (DHCP) proxy.

3. The network of claim 1, wherein the processor is further configured with an agent configured to promote transfer of the DHCP context to a similar agent in the similar network.

4. The network of claim 3, wherein the network component is a dynamic host configuration protocol (DHCP) proxy associated with the MS, and wherein the agent is associated with the MS, and wherein the agent and the DHCP proxy relocate substantially simultaneously.

5. The network of claim 1, wherein the network component is part of a worldwide interoperability for microwave access (WiMAX) network.

6. The network of claim 1, wherein the IP address is public.

7. The network of claim 1, wherein the network component is part of a network, and wherein the network is configured such that any packets or messages containing the common IP address as a source address or a destination address are prohibited from leaving the network.

8. The network of claim 1, wherein the network component is configured to use the IP address as a source IP address in a message sent to the MS.

9. A network component comprising:
    a processor configured to
        communicate with a mobile station (MS) using an internet protocol (IP) address that is common for similar elements in similar networks, wherein each of the similar elements in the similar networks has another IP address in addition to the common IP address, and
        receive a dynamic host configuration protocol (DHCP) context associated with the MS.

10. The network component of claim 9, wherein the DHCP context is received using a foreign agent relocation message.

11. The network component of claim 9, wherein the IP address is used exclusively by a plurality of DHCP proxies.

12. The network component of claim 9, wherein the MS does not support mobile IP.

13. The network component of claim 9, wherein the DHCP context comprises a mobile station IP address and a mobile station IP address lease time.

14. A method of wireless communication, the method comprising:
- at a first network component, receiving a dynamic host configuration protocol (DHCP) context associated with a mobile station (MS) from a second network component; and
- communicating with the MS using an internet protocol (IP) address that is common for similar elements in similar networks, wherein each of the similar elements in the similar networks has another IP address in addition to the common IP address.

15. The method of claim 14, wherein the MS does not support mobile IP.

16. The method of claim 14, wherein the first and the second network components belong to a same network access provider.

17. The method of claim 14, wherein the DHCP context comprises a mobile station IP address and a mobile station IP address lease time.

18. The method of claim 14, wherein all messages associated with the IP address are configured to go to or originate at the network component.

19. A network component comprising:
- a processor configured to receive a dynamic host configuration protocol (DHCP) context associated with a mobile station, wherein the DHCP context is received using a foreign agent relocation message.

20. The network of claim 19, wherein the DHCP context comprises a mobile station IP address and a mobile station IP address lease time.

21. A method of wireless communication, the method comprising:
- receiving a dynamic host configuration protocol (DHCP) context associated with a mobile station, wherein the DHCP context is received using a foreign agent relocation message.

22. The method of claim 21, wherein the DHCP context comprises a mobile station IP address and a mobile station IP address lease time.

* * * * *